(12) United States Patent
Irrgang et al.

(10) Patent No.: US 7,740,403 B2
(45) Date of Patent: Jun. 22, 2010

(54) HIGH-TEMPERATURE SENSOR

(75) Inventors: Klaus Irrgang, Geraberg (DE); Barbara Irrgang, Geraberg (DE); Hartmut Kaempf, Elgersburg (DE); Winfried Heinz, Elgesberg (DE); Klaus-Dieter Schaetzler, Geraberg (DE); Aldo Bojarski, Hoeckendorf (DE); Werner Fichte, Colmitz (DE)

(73) Assignee: Temperaturmesstechnik Geraberg GmbH, Martinroda (DE)

( * ) Notice: Subject to any disclaimer, the term of this patent is extended or adjusted under 35 U.S.C. 154(b) by 925 days.

(21) Appl. No.: 10/588,826

(22) PCT Filed: Feb. 9, 2004

(86) PCT No.: PCT/DE2004/000225

§ 371 (c)(1),
(2), (4) Date: Oct. 10, 2006

(87) PCT Pub. No.: WO2005/075949

PCT Pub. Date: Aug. 18, 2005

(65) Prior Publication Data

US 2007/0171959 A1 Jul. 26, 2007

(51) Int. Cl.
*G01K 7/16* (2006.01)
(52) U.S. Cl. .................. 374/185; 374/163; 374/208; 73/866.5
(58) Field of Classification Search ............... 374/163, 374/179, 183, 185, 208, 141, 144, 100, 46, 374/55, 187; 73/866.5; 338/22 R, 28, 25
See application file for complete search history.

(56) References Cited

U.S. PATENT DOCUMENTS

| 4,074,630 | A | * | 2/1978 | Zondag ..................... 89/1.14 |
| 4,183,248 | A | * | 1/1980 | West ......................... 374/164 |
| 4,527,909 | A | * | 7/1985 | Dale et al. ................. 374/163 |
| 4,934,831 | A | * | 6/1990 | Volbrecht ................. 374/183 |
| 5,209,571 | A | | 5/1993 | Kendall |
| 5,388,908 | A | | 2/1995 | Kendall |
| 5,743,646 | A | * | 4/1998 | O'Connell et al. ........ 374/148 |
| 5,749,656 | A | * | 5/1998 | Boehm et al. ............. 374/185 |
| 5,959,524 | A | | 9/1999 | Wienand |
| 6,264,363 | B1 | * | 7/2001 | Takahashi et al. ......... 374/185 |
| 6,286,995 | B1 | * | 9/2001 | Takahashi et al. ......... 374/148 |
| 6,305,841 | B1 | * | 10/2001 | Fukaya et al. ............. 374/185 |
| 6,501,366 | B2 | * | 12/2002 | Takahashi et al. ......... 338/25 |
| 6,698,922 | B2 | * | 3/2004 | Adachi et al. ............. 374/208 |
| 6,762,671 | B2 | * | 7/2004 | Nelson ...................... 338/25 |

(Continued)

FOREIGN PATENT DOCUMENTS

DE        1648261      5/1971

(Continued)

*Primary Examiner*—Gail Verbitsky
(74) *Attorney, Agent, or Firm*—Muncy, Geissler, Olds & Lowe, PLLC

(57) ABSTRACT

The invention relates to a high-temperature sensor, which can be used at temperatures of at least 600° C. and comprises a metallic protective tube and a measuring resistance that is surrounded by a ceramic powder. The measuring resistance is connected to the electric cable by means of stress-relieved measuring resistance connecting wires and internal conductors. The latter are provided with a solid and/or flexible insulation consisting of a ceramic material. The measuring resistance and the internal conductors are arranged in a metallic protective tube, which narrows in the vicinity of the measuring resistance. The ceramic powder contains admixtures of oxygen-giving oxide compounds.

16 Claims, 6 Drawing Sheets

U.S. PATENT DOCUMENTS

| | | | |
|---|---|---|---|
| 6,880,969 B2 * | 4/2005 | Adachi et al. | 374/185 |
| 6,899,457 B2 * | 5/2005 | Kurano | 374/185 |
| 7,026,909 B2 * | 4/2006 | Glozman et al. | 338/28 |
| 7,036,224 B2 * | 5/2006 | Gul | 29/857 |
| 7,060,949 B1 * | 6/2006 | Davis et al. | 219/536 |
| 7,553,078 B2 * | 6/2009 | Hanzawa et al. | 374/185 |
| 2002/0090019 A1 | 7/2002 | Marto et al. | |
| 2002/0131477 A1 * | 9/2002 | Kurano | 374/185 |
| 2004/0190592 A1 * | 9/2004 | Lojen | 374/172 |
| 2004/0202227 A1 * | 10/2004 | Nelson et al. | 374/208 |
| 2008/0080592 A1 * | 4/2008 | Houben et al. | 374/185 |
| 2008/0205484 A1 * | 8/2008 | Toudou et al. | 374/185 |

FOREIGN PATENT DOCUMENTS

| | | |
|---|---|---|
| DE | 3012787 | 10/1981 |
| DE | 3939165 | 10/1990 |
| DE | 4207317 | 9/1993 |
| DE | 29823459 | 6/1999 |
| DE | 29823379 | 7/1999 |
| DE | 19922928 | 11/1999 |
| DE | 19934738 | 1/2000 |
| DE | 19939493 | 3/2000 |
| DE | 19941188 | 3/2000 |
| DE | 10034265 | 2/2001 |
| DE | 10062041 | 7/2002 |
| EP | 0774650 | 5/1997 |
| JP | 01233333 A * | 9/1989 |

* cited by examiner

HIGH-TEMPERATURE SENSOR

BACKGROUND OF THE INVENTION

The invention relates to a high-temperature sensor with a metallic protective tube and a measuring resistance which is surrounded by a ceramic powder.

Metallic protective tube denotes a metallic casing enclosing the temperature sensor's components, whereby a part of the protective tube enclosing the measurement element protrudes into the medium and an outer part of the protective tube holds the connecting cables leading outside.

Process adapter means the mechanical interface, e.g. a pipeline, between the temperature sensor and the recipient containing the medium whose temperature shall be acquired.

The electrical adapter is the interface between the inner cables running inside the casing and the outer connecting cables.

The preferred field of application is in temperature measuring points with heavy mechanical and thermal duty, e.g. in exhaust ducts of combustion engines.

In order to improve the engine management system of combustion and gas engines temperature sensors are needed, whose working temperature is in the range from 600° C. to 900° C. The measuring points for the temperature sensors are mostly in a part of the exhaust duct close to the engine. The chemical-corrosive, mechanical and thermal operational conditions present when measuring exhaust gas temperatures make very high demands on the temperature sensor's components and require elaborate means regarding the materials to be employed and sophisticated measures for holding the components steady and designing the components connections.

A multitude of arrangements for solving particular problems out of the aforementioned ones is known as prior art.

For instance, DE 199 34 738 A1 and DE 100 62 041 A1 are known, which claim to achieve an improved technology in design and connections between the sensor and the inner cables by encapsulating the temperature sensor's connection-sided part with a temperature-proof, electrically non-conductive material or by forming it with an overlapping connection of the thermistor contacts and the inner signal cables and a tight fit.

Technical measures for saving the measuring element are given in DE 30 12 787 A1 and DE 199 22928 A1.

Different measures regarding protection against sensor harming ambiences are given in DE 298 23 459 U1 and EP 0774 650 A1.

EP 0774 650 A1 suggests to arrange a mechanically stable and liquid-tight connection in the connective area of a tube-shaped casing for allowing the influx of atmospheric oxygen from the environment via a connective cable into the casing. Furthermore it is known from DE 298 23 459 U1 to permit the oxygen influx via a special neck pipe opening. However besides the complicated design the necessity to apply openings to the sensor mounts is a disadvantage.

Solutions for improving metrological heat dissipation and radiation errors are given in DE 199 39 493 A1 and DE 298 23 379 U1.

Arrangements for improving the protection of the mechanical armature components, which achieve an adaption to specifications for strength and production by different diameter geometry are given in DE 100 34 265 A1 and DE 199 41 188 A1.

Disadvantages in the described arrangements besides the elaborate and expensive production are that in each case only particular ones out of the aformentioned problems are faced, thus the causes for metrological, electrical or mechanical malfunctions are not eliminated generally.

Furthermore for thermocouples arranged inside ceramic protective tubes it is known from DE 42 07 317 C2, DE 16 48 261 A and U.S. Pat. No. 5,209,571 A to use powders inside the protective tubes which oxygen-reducing components are added to in order to protect the thermo wires applied in these arrangements against oxidation and thus extend their life cycle. However these measures are not applicable for arrangements with platinum resistive sensors because reductive conditions would reduce the life cycle of the platinum resistor.

It is the object of the invention to specify a high temperature sensor of the aforementioned kind which can be applied at a temperature of at least 600° C., which resists to high mechanical and chemical stress, which can be made technologically convenient and which improves reliability and life cycle compared to known temperature sensors.

SUMMARY OF THE INVENTION

A high-temperature sensor of the invention comprises a metallic protective tube and a measuring resistance connected to an electric cable. At least one auxiliary component, having a higher coefficient of thermal expansion than the protective tube, is arranged proximate connection of the connecting cable to the protective tube. The measuring resistance is connected to the electric cable by means of strain-relieved measuring resistance connection wires and internal conductors. The measuring resistance together with the connection wires are contained in a ceramic housing and the ceramic housing is surrounded by ceramic powder densely filling the protective tube. The metallic protective tube in which the measuring resistance and the internal conductors are arranged is tapered in the vicinity of the measuring resistance. The ceramic powder contains admixtures of oxygen-providing oxide compounds.

The invention is described below in more detail by means of embodiments and accompanying figures.

Figure 1:
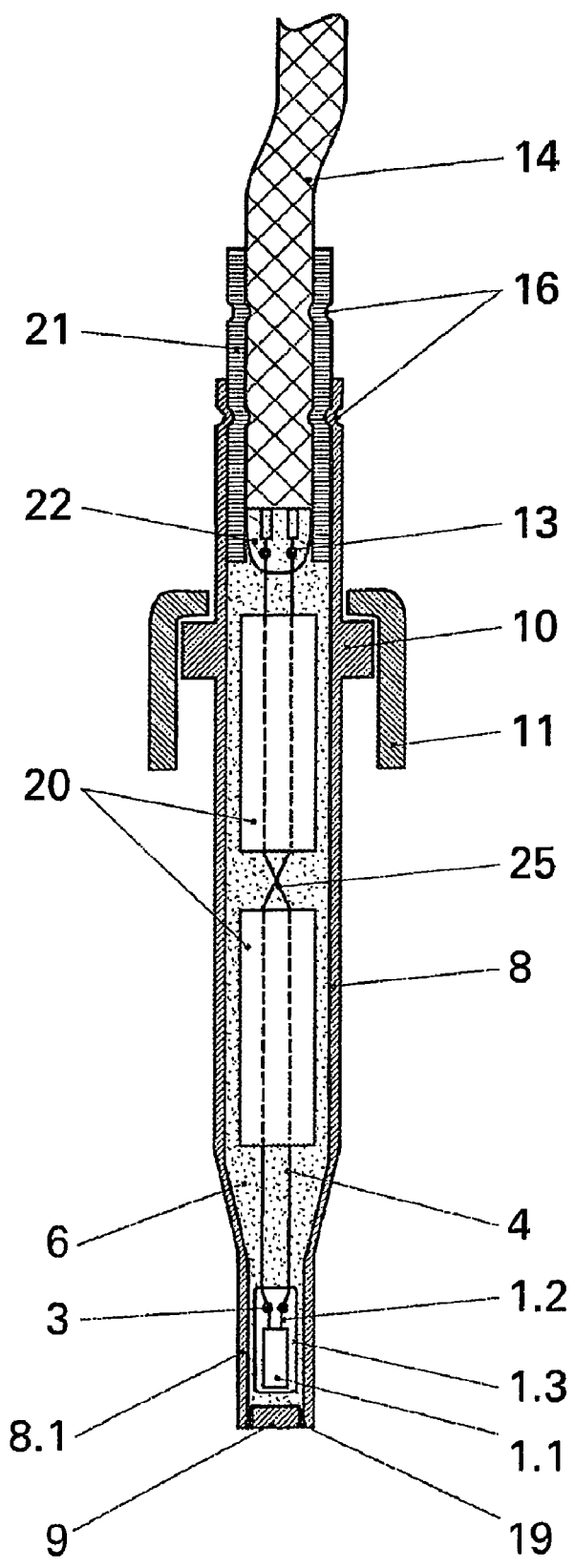
FIG. 1 is a schematic longitudinal section through a high-temperature sensor in a straight design.

The high-temperature sensor depicted in FIG. 1 exhibits an encapsulated measuring resistance 1 in the form of a platinum thin film measuring resistance 1.1 with measuring resistance connective wires 1.2 with the platinum thin film measuring resistance arranged and puttied in a ceramic saggar jacket 1.3 and electrically connected to the wire-shaped interior conductors 4 consisting of a nickel-alloy via the welded joint 3.

The interior conducting wires are led through sections of the ceramic insulation, particularly formed as ceramic capillaries 20, whereby crossings 25 of the interior conducting wires 4 are arranged in defined intervals for keeping longitudinal traction or thrust as a result of dilatation away from the encapsulated measuring resistance 1. The interior conducting wires 4 are connected to the connecting cable 14 at the cold end of the protective tube 8 containing the whole sensor arrangement via the electrical joint 13.

In order to connect and strain-relief the connecting cable 14 to the protective tube 8 an auxiliary component 21 connecting the connecting cable 14 to the protective tube 8 by means of multiple joints formed as crimpings 16 is arranged between the connecting cable 14 and the protective tube 8. For a shock-proof arrangement of the encapsulated measuring resistance 1 in the protective tube 8 the measuring resistance 1 is inserted in a vibrating manner into the protective tube 8 together with a ceramic powder 6. Loosening of the powder caused by thermal expansion of the protective tube 8 are compensated by the expansion of the auxiliary component 21 designed as an aluminum jacket together with the protruding material of the cable 14, whereby the dimensioning for the relative zero-volume-dilatation is adjusted to the operating point of the high-temperature sensor.

The ceramic powder 6 has oxygen-giving powders added which release oxygen above 500° C. manganese (IV) oxide is particularly suited for this. This way the formation of a reductive atmosphere and therewith diffusion processes at the measuring resistance 1.1 and the decrease of the oxygen partial pressure respectively are prevented. It could be proved that the oxygen partial pressure falls at rising temperatures in closed sensor systems consisting of non-oxidation-proof metallic materials. A closed system results from metallic implementations of temperature sensors tightly welded on the side of the measuring resistance and tightly cast in on the side of the connection.

A process adapter, in this case consisting of a sealing collar 10 weld on the protective tube 8 and a coupling nut, is attached to the protective tube 8. It is likewise possible to provide the protective tube 8 with outside thread armatures for screw-in bushings in the measuring point.

The protective tube 8 is advantageously provided with a taper 8.1 in an area which the measuring resistance 1.1 is situated in. The bottom 9 of the protective tube 8 is tightly welded on the lower end of the protective tube 8. The protective tube 8 together with its bottom 9 can alternatively be formed as one piece in the form of a turned piece.

Figure 2:
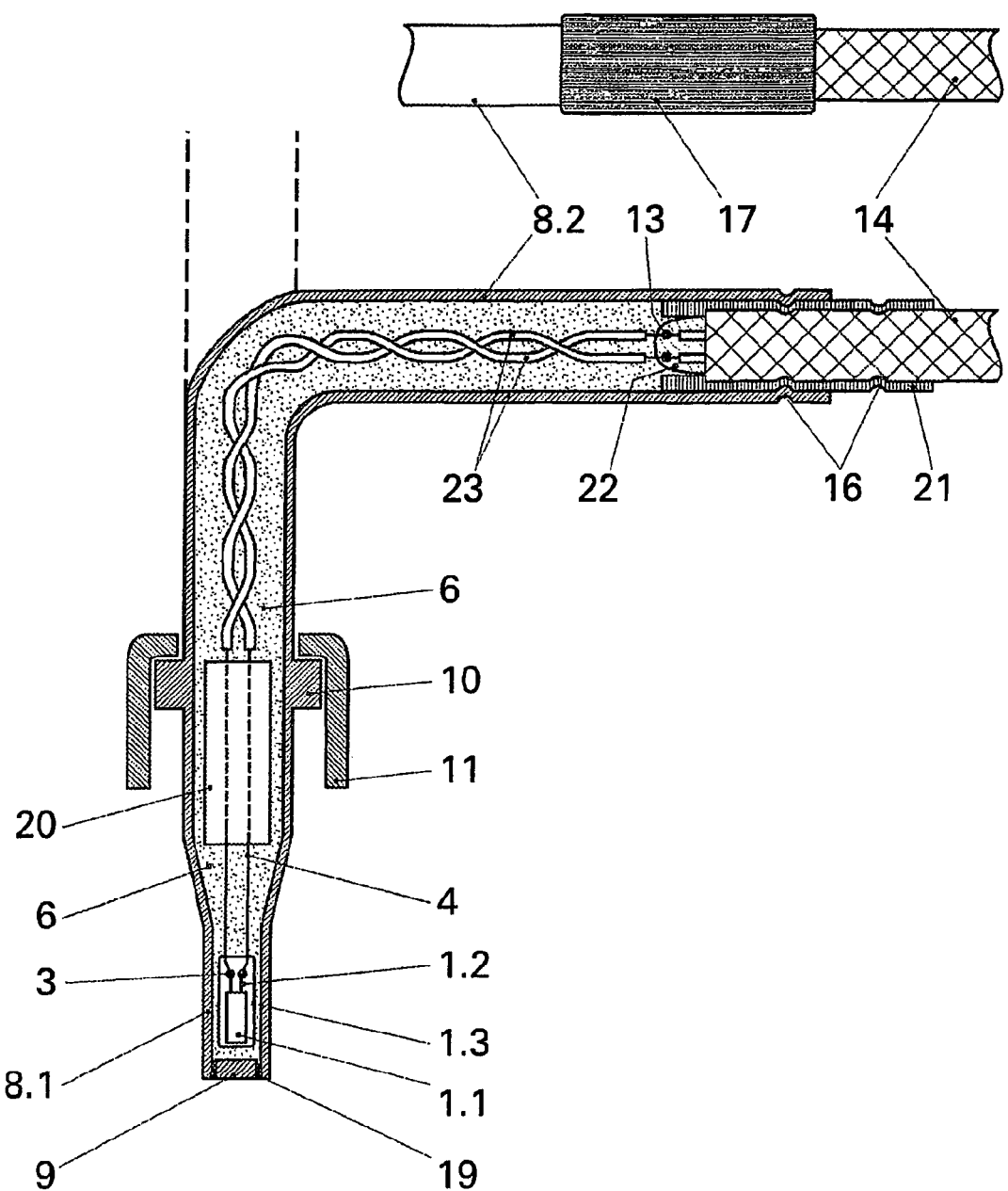
FIG. 2 is a schematic longitudinal section through a high-temperature sensor in an angled design with an insulation by ceramic capillaries and insulating tubes made of ceramic fiber.

The outgoing cable line of the connecting cable 14 is advantageously protected against mechanical stress by bend protection springs or by the plastic injection-molded fitting shown in FIG. 2.

It is also possible to avoid powder loosening by mixing additions of a powder with a volume expansion coefficient significantly higher than that of aluminium oxide or magnesium oxide to the ceramic powder 6. A particularly advantageous arrangement results from inserting the ceramic powder 6 in layers into the protective tube 8, whereby aluminum oxide is arranged in the measuring tip containing the measuring resistance while a mixture of aluminum oxide and oxygen-providing oxide compounds is arranged in the middle part of the arrangement and a mixture of aluminum oxide and a powder with a greater volume expansion coefficient is arranged in the cable connection part adjacent to the middle part.

In the arrangement shown in FIG. 2 the part of the temperature sensor protruding into the medium under test and the process adapter consisting of the sealing collar 10 and the coupling nut 11 coincide with the arrangement shown in FIG. 1. In its outer range the protective tube 8 exhibits the 90° offset angled part 8.2 of the protective tube 8. The wire-shaped interior conductors 4 going through that range are slightly twisted and provided with insulating hoses 23 consisting of ceramic fibers. The connection to the connecting cable 14 is carried out at the angled part 8.2 of the protective tube 8 at the electrical joint 13 enclosed with glue 22.

At least one auxiliary component 21, designed as a jacket and having a higher expansion coefficient than the protective tube 8 is arranged between the connecting cable 14 and the protective tube 8, so that different volume changes of the protective tube 8 and the ceramic powder 6 caused by temperature fluctuations are compensated and cavities are avoided. Preferably an intermediate jacket consisting of aluminium is used.

Figure 3:
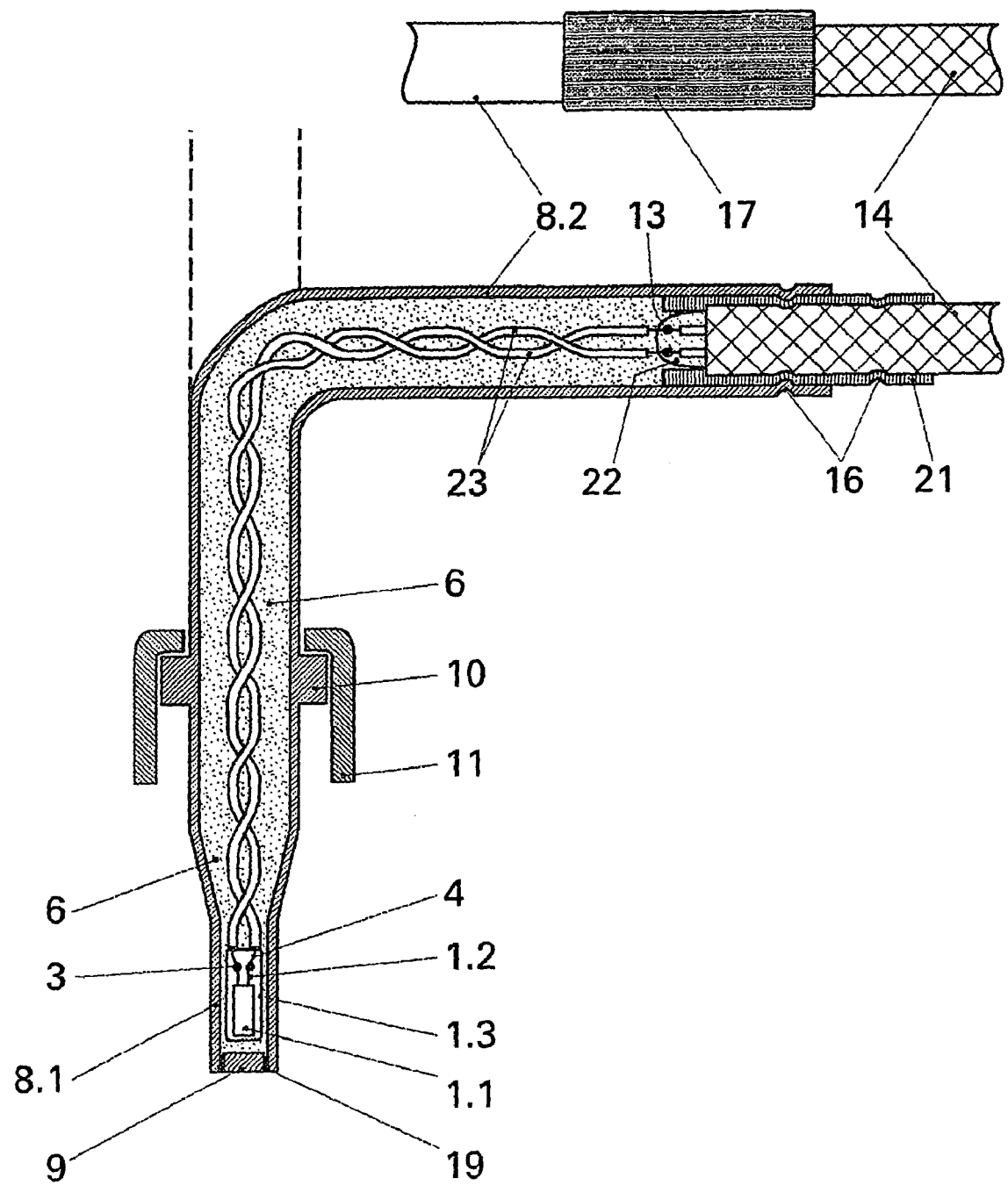
FIG. 3 is a schematic longitudinal section through a high-temperature sensor in an angled design with complete insulation by insulating tubes made of ceramic fiber.

FIG. 3 shows a longitudinal section through a version of a high-temperature sensor in an angled design in which the wire-shaped interior conductors 4 are entirely insulated by insulating hoses 23 consisting of ceramic or glass-ceramic fibers.

Figure 4:
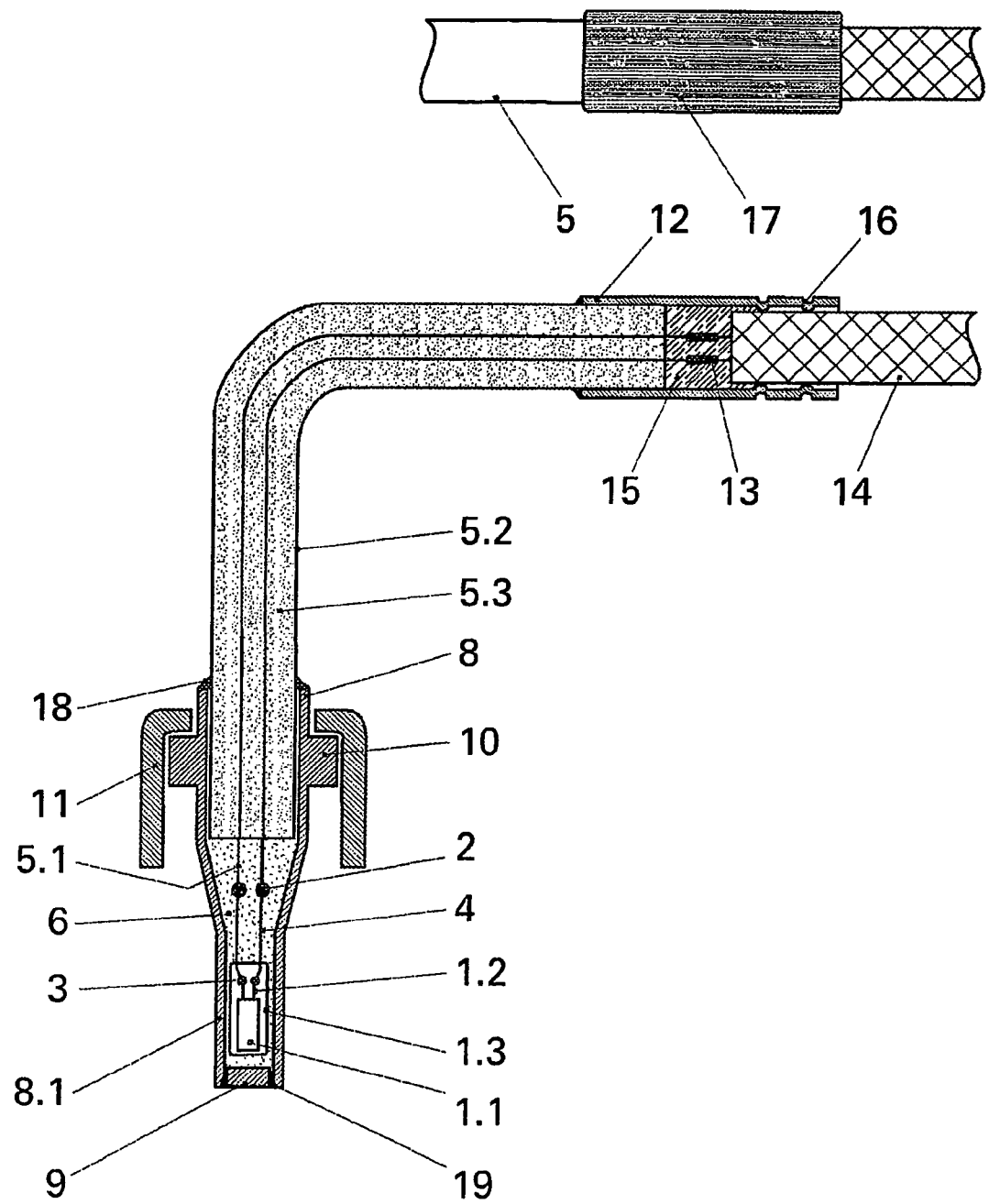
FIG. 4 is a schematic longitudinal section through a high-temperature sensor with a jacketed cable.

FIG. 4 depicts an embodiment, in which an angled mineralic-insulated jacketed cable 5 leads out of the protective tube 8. It goes without saying that in the same way elongated arrangements can be carried out.

At the end of the jacketed cable 5 an intermediate jacket 12 is weld on the jacketed cable's exterior metal jacket 5.2. Inside the intermediate jacket 12 joints 13, by which the interior conductors 5.1 of the jacketed cable 5 are connected to the connecting cable 14, are situated in a pottant 15. The connecting cable 14 is attached by means of the crimpings 16 in a way, that results in a strain-relief.

In the range of the process adapter the protective tube 8 is welded on the jacketed cable 5 in such a way, that the weld seam 18 is on the jacketed cable outside the medium and thus protected from its aggressive impact. In the embodiment shown here the protective tube 8 is implemented a little shorter than in the arrangements shown in the FIGS. 1 and 2, however it exhibits a similar outline and contains the entire configuration of the high-temperature sensor. The interior of the medium-sided part of the sensor is filled with ceramic powder 6, which oxygen-providing powders are mixed to. The interior conductors 4 are connected to the jacketed cable's interior conductors 5.1 by joints 2 and to the measuring resistance 1.1 by the joint of the measuring resistance connection wires.

The bottom 9 of the protective tube 8 is attached to the taper 8.1 by the weld seam 19. The process adapter consists of a sealing collar welded on the protective tube 8 and the coupling nut 11, but can be alternatively constructed with a pressure screw or other fasteners. Furthermore the protective tube can be formed by deep drawing or by machining and welding.

An advantageous embodiment not depicted here has a metallic ring-shaped component with a high expansion coefficient and strongly oxidized surface arranged directly behind the jacketed cable 5 inside the protective tube 8.

Figure 5:
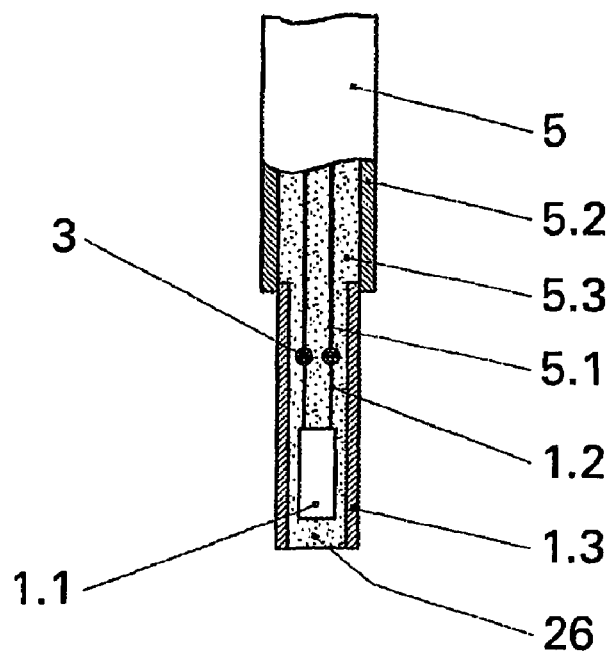
FIG. 5 is a diagram of a section of a high-temperature sensor with a one-piece ceramic saggar jacket for a sensor and a mineralic cable.

In yet another embodiment depicted in FIG. 5 the interior conductors 5.1 of the jacketed cable 5, the powder fill 5.3 and the measuring resistance 1.1 with its connective wires 1.2 and the joint 3 of the measuring resistance connection wires are encapsulated by an extended, ceramic saggar jacket 1.3. The saggar jacket 1.3 and the clearance to the jacketed cable are filled with high-temperature cement 26 thus creating a one-piece form. In contrast to the arrangements known as prior art a connection of this cement compound to the protective tube 8 is deliberately abstained from so radial dilatation movements do not affect the sensor's function.

Figure 6:
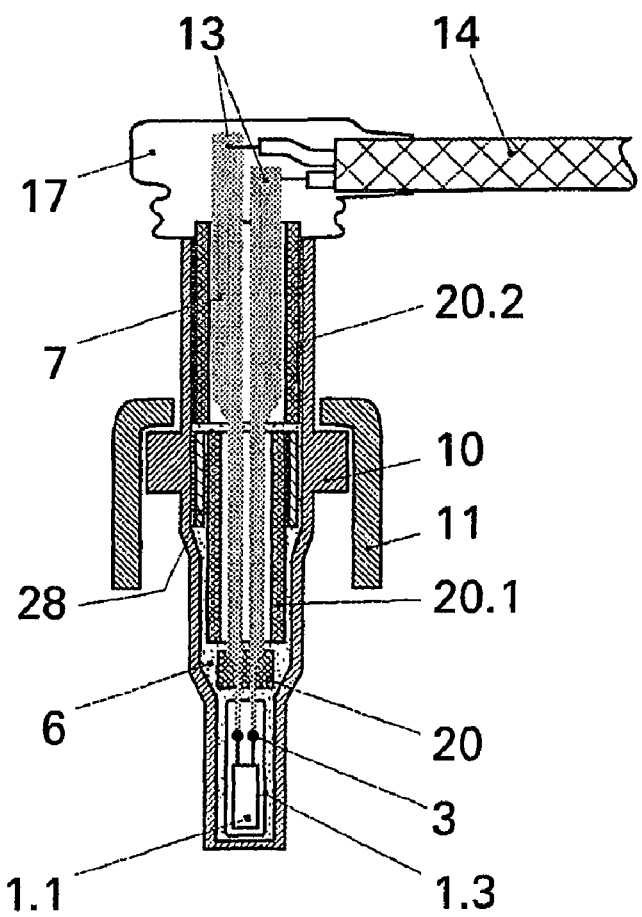
FIG. 6 is a schematic longitudinal section of a high-temperature sensor with profiled interior conductors and FIG. 7 is a top view onto the cross sectional area of an inner configuration with a profiled interior conductor sheet.

FIG. 6 shows a schematic longitudinal section of a high-temperature sensor, whereby punched profiled parts 7 which have tube-shaped ceramic formed parts 20.1 and 20.2 with profiled interior and exterior outlines pulled over their ends, serve as interior conductors 4. The profiled interior conducting sheets are preferably punchings and are welded on the measuring resistance 1.1 at the sensors side. The measuring resistance 1.1 and the joint 3 are covered with the ceramic saggar jacket 1.3, which is filled with high-temperature cement 26. The arrangement is arranged in a protective tube 8 and filled with ceramic powder 6, which has oxygen-giving oxide powders added, whereby the protective tube 8 exhibits a big inner diameter in its part remote from the sensor, so that partially highly oxidized metal rings 28 with high expansion coefficients are arranged around the ceramic formed parts 20, respectively 20.1 and 20.2, whereby significant clearances exist between the ceramic formed parts 20.1, 20.2 and the metal rings 28. The connecting cable 14 is connected to these ends of the profiled parts 7 and the area of the profiled parts' 7 connection to the connecting cable 14 is protected against mechanical stress by a plastic injection-molded fitting 17.

In an advantageous embodiment metallic components with a high expansion coefficient and highly oxidized surface, which compensate the relative decrease of the volume occupied by the ceramic powder 6 at rising temperatures against the protective tube's interior and which release oxygen from the pre-oxidized surface to the protective tube's interior, are arranged in the upper part of the protective tube 8.

Furthermore it is possible, that the metallic components inserted are a fill of metallic grains, which are heavily pre-oxidized and exhibit a relatively high expansion coefficient compared to that of the protective tube 8.

Figure 7:
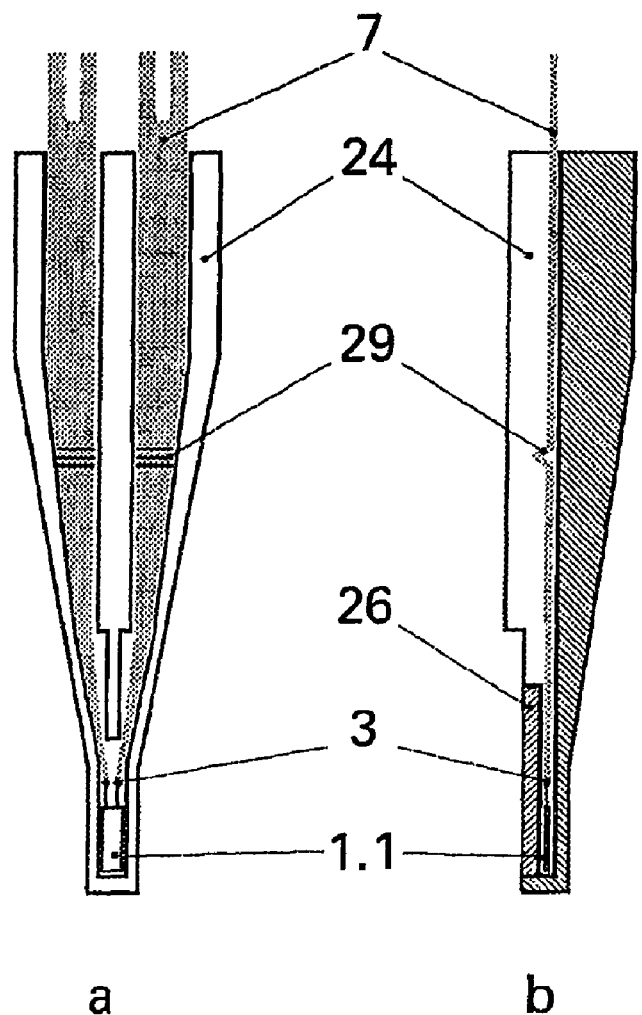

In the arrangement shown in FIG. 7 the profiled interior conducting sheets 7 are inserted into one or more ceramic inlays 24, whereby the interior conducting sheets 7 are welded on the measuring resistance 1.1 and secured with high-temperature cement 26. The interior conducting sheets 7 exhibit an expansion compensation, preferably designed in the form of a V-shaped crimping.

LIST OF REFERENCES

Encapsulated Measuring Resistance
1.1 measuring resistance
1.2 measuring resistance connective wire
1.3 saggar jacket
2 joint to the jacketed cables interior conductor
3 joint of the measuring resistance connection wires
4 interior conductor
5 jacketed cable
5.1 interior conductor of the jacketed cable
5.2 exterior metal jacket of the jacketed cable
5.3 powder fill of the jacketed cable
6 ceramic powder
7 profiled interior conducting sheet
8 protective tube
8.1 taper
8.2 angled part of the protective tube
9 bottom of the protective tube
10 sealing collar
11 coupling nut
12 intermediate part
13 joint to the connecting cable
14 connecting cable
15 pottant
16 crimping
17 plastic injection-molded fitting
18 weld seam at the jacketed cable
19 weld seam at the protective tube's bottom
20 ceramic formed part
20.1 ceramic guiding part for profiled interior conductors
20.2 upper ceramic formed part
21 auxiliary component
22 sealing glue
23 insulating hose consisting of ceramic fibers
24 ceramic inlay
25 crossing of the interior conductors
26 high-temperature cement
28 metal ring, partially highly oxidized
29 Expansion compensation

The invention claimed is:

1. High-temperature sensor comprising a metallic protective tube and a measuring resistance arranged in a ceramic casing together with strain-relieved measuring resistance connection wires, the ceramic casing being surrounded by a ceramic powder and connected to an electric connecting cable, wherein the strain-relieved measuring resistance connection wires and internal conductors connect the measuring resistance to the electric cable, said measuring resistance encapsulated in the ceramic casing and said internal conductors are arranged in said metallic protective tube, said protective metallic tube has a tapered tip in the vicinity of said measuring resistance and said ceramic powder densely fills the protective tube and comprises admixtures of oxygen-providing oxide compounds and the sensor comprises at least one auxiliary component arranged proximate connection of the connecting cable to the protective tube, the at least one auxiliary component having a higher coefficient of thermal expansion than the protective tube.

2. High-temperature sensor according to claim 1, wherein said ceramic powder comprises aluminum oxide and/or magnesium oxide and an oxygen-providing metallic or inorganic non-metallic redox agent.

3. High-temperature sensor according to claim 1 or 2, wherein said auxiliary component is an intermediate jacket consisting of aluminum.

4. High-temperature sensor according to claim 1 or 2, wherein the internal conductors are provided with ceramic insulation and the ceramic casing is sufficiently long that it extends beyond a joint of the measuring resistance connection wires to the internal conductors and a space between the measuring resistance with the measuring resistance connection wires and the ceramic casing is filled with a high-temperature-resistant cement.

5. High-temperature sensor according to claim 1 or 2, further comprising a jacketed cable having internal conductors and wherein the ceramic casing is sufficiently long that it extends beyond a joint of the measuring resistance connection wires to the internal conductors of the jacketed cable and a space between the measuring resistance with the measuring resistance connection wires is filled with a high-temperature-resistant cement.

6. High-temperature sensor according to claim 1 or 2, wherein the measuring resistance comprises a platinum thin film measuring resistance.

7. High-temperature sensor according to claim 1 or 2, further comprising a coupling for coupling the sensor to a site at which the high temperature sensor is to be utilized and a minerally insulated jacketed cable is welded on the protective tube, a joint formed by the weld being situated outside a part of the sensor which is directly behind the coupling.

8. High-temperature sensor according to claim 7, wherein the coupling comprises a collar welded on the protective tube.

9. High-temperature sensor according to claim 5, wherein the ceramic housing extends to or slightly into the jacket of the jacketed cable and the high-temperature-resistant cement fills the ceramic casing.

10. High-temperature sensor according to claim 9, further comprising a high-temperature-resistant injection molded plastic fitting within which the internal conductors of the jacketed cable are connected to the connecting cable.

11. High-temperature sensor according to claim 9, further comprising a high-temperature-resistant injection molded plastic fitting within which the internal conductors of the protective tube are connected to the connecting cable.

12. High-temperature sensor according to claim 1 or 2, further comprising a material having a substantially higher coefficient of thermal expansion than the coefficient of thermal expansion of the metal of the protective tube and having surfaces at least portions of which are highly oxidized, the material being arranged in middle and/or upper portions of the protective tube for helping to keep the protective tube relatively filled as the tube undergoes thermal expansion substantially greater than that of the ceramic powder and for releasing oxygen into the protective tube.

13. High-temperature sensor according to claim 12, wherein the material comprises granular metal or granular inorganic non-metal.

14. High-temperature sensor according to claim 1 or 2, wherein the internal conductors comprise conducting sheets within ceramic tubes, the internal conductors are joined to the measuring resistance, and the measuring resistance, including the joint thereof with the internal conductors, are received within the ceramic casing, the ceramic casing being filled with a high-temperature-resistant cement, and the high-temperature sensor further comprises at least one metallic ring having a high thermal coefficient of expansion, the protective tube having a wider end and the at least one metallic ring being inserted in an annular space between the protective tube and a said ceramic tube with a clearance.

15. High-temperature sensor according to claim 1, wherein the protective tube has been formed by deep drawing and includes a sealing collar formed thereon.

16. High-temperature services according to claim 1, wherein the protective tube has been formed by machining and drilling.

* * * * *